United States Patent [19]

Pusch

[11] 3,941,191

[45] Mar. 2, 1976

[54] METHOD OF CONSOLIDATING UNCONSOLIDATED OR INSUFFICIENTLY CONSOLIDATED FORMATIONS

[75] Inventor: Gunter Pusch, Celle, Germany

[73] Assignee: Deutsche Texaco Aktiengesellschaft, Hamburg, Germany

[22] Filed: Aug. 16, 1974

[21] Appl. No.: 497,995

[30] Foreign Application Priority Data

Aug. 25, 1973 Germany............................ 2343021

[52] U.S. Cl. .................. 166/288; 166/260; 166/261
[51] Int. Cl.² ........................................ E21B 43/24
[58] Field of Search.................... 166/260, 261, 288

[56] References Cited
UNITED STATES PATENTS

| | | | |
|---|---|---|---|
| 2,863,510 | 12/1958 | Tadema et al. ..................... | 166/260 |
| 3,172,468 | 3/1965 | Watson et al. ...................... | 166/260 |
| 3,180,412 | 4/1965 | Bednarski et al. .................. | 166/260 |
| 3,269,461 | 8/1966 | Strange et al. ..................... | 166/288 |
| 3,342,260 | 9/1967 | Lumpkin............................. | 166/261 |
| 3,379,254 | 4/1968 | Holmes............................... | 166/260 |
| 3,388,743 | 6/1968 | Engle et al. ......................... | 166/260 |
| 3,490,530 | 1/1970 | Dean et al. ......................... | 166/260 |

*Primary Examiner*—Stephen J. Novosad
*Assistant Examiner*—George A. Suckfield
*Attorney, Agent, or Firm*—T. H. Whaley; C. G. Ries; Charles L. Bauer

[57] ABSTRACT

A method for consolidating an oil-bearing formation by the use of a consolidating material together with a combustion promoter whereby oxidation occurs upon the injection of an oxygen-containing gas, thereby affecting consolidation of the formation.

25 Claims, No Drawings

METHOD OF CONSOLIDATING UNCONSOLIDATED OR INSUFFICIENTLY CONSOLIDATED FORMATIONS

BACKGROUND OF THE INVENTION

This invention relates to a method for consolidating an oil-bearing matrix by use of solidifying or consolidating material together with a combustion promoter and an oxidizing agent to produce a coke-like residue for the consolidation.

The recovery of crude oil or natural gas from underground deposits through wellbores assumes the presence of a bed of storage or reservoir rock in the pores or fissures of which the oil or gas can be trapped or collected. As a rule the reservoir rock consists of sand, clay or chalk sediments cemented together by clay, chalk or silicate binders. If this cement, which links together the particles of the supporting structure, is missing either in whole or in part, then one may speak of unconsolidated or poorly consolidated reservoir rocks. In places where the supporting action of neighboring particles or grains in an agglomeration of particles or grains is missing as, for example, in an "open hole" or wellbore, the reservoir rocks tend to subside and under the influence of the transverse action exerted by flowing liquids or gases the grains may be carried away. Both, production wells and injection wells may be affected seriously by the presence of sand grains in the liquid causing erosion of the bore hole installations, stopping of the sucker rod pumps or blocking of the flow channels.

In order to counteract these problems, special sand consolidating methods have been developed, all of which have the following characteristics in common: a fluid, wetting substance is forced into the matrix or rock formation, the substance being such that through the effect of a catalyst or of the temperature it solidifies. It displaces the contents of the pores and wets the surface of the rock particles with a film. In the intergranular pore spaces a liquid meniscus forms and is held firm by capillary effects. The excess liquid from the pores is displaced by a gas or liquid in order to maintain the permeability of the rock which is to be consolidated. After the solidifying substance has hardened, those grains which have been wetted by the substance are bonded or cemented together.

Polymerizing substances have hitherto often been used as the hardening or consolidating material. They have either been mixed with a catalyst (hardener) or hardened by the action of temperature. For example, epoxy resin or formaldehyde and a phenolic compound have been used. In order to remove the superfluous chemicals, diesel oil has normally been used as an after-wash fluid.

It is the object of the invention to provide an improvement in the known processes of hardening or consolidating unconsolidated sediments, strata or formations.

The object is achieved by a process for hardening unconsolidated or insufficiently consolidated sediments, which process is characterized in that residual oil in the formation is mixed with a material which promotes the combustion of the solidifying material. An after-wash fluid may then be injected to wash away the excess material and to restore the permeability of the formation or bed. Thereafter the mixture is brought into contact with an oxidizing agent in order to form a hard deposit or residue in the intergranular spaces of the matrix.

DESCRIPTION OF THE PREFERRED EMBODIMENT

The present invention relates to a method for consolidating an oil bearing matrix particularly around a wellbore penetrating the formation matrix. I have found that the residual oil in the formation can generally be used as a consolidating material when a combustion promoter is present and an oxidizing agent is thereafter injected. The scope of invention also includes the injection of additional oil, either from the same formation or another source, if the concentration of the original residue oil is too small. It is also within the scope of the invention to introduce a secondary consolidating material that is also capable of forming a coke-like residue or deposit. This secondary consolidating material may be used in combination with the combustion promoter and the oxidizing agent.

In practice the invention is suitably carried out by directly injecting the combustion promoter, via a wellbore, into the formation where consolidation is to occur. In the event that the amount of the residual oil in the formation is not sufficient, additional oil can be premixed with the combustion promoter which mixture is then introduced directly into the formation where the consolidation is to occur. In the event a secondary consolidating material is to be used, it can be added to the pre-injection mixture of the combustion promoter and the oil. Before consolidation is accomplished, a wash-fluid is injected to insure the permeability of the formation. Thereafter an oxidizing material such as an oxygen-containing gas is injected into the formation to effect oxidation of the residual oil, and the secondary consolidating material (in the situation where it has been employed).

The combustion promoter may be any material that promotes the combustion of the oil or of the secondary consolidating material, such as autoxidizing substances or oxidation initiators and activators. Particularly suitable autoxidizing compounds are indene, fluorene, the dihydronaphthalenes, as e.g. 1,2-dihydronaphthalene and the dihydroanthracenes such as 9,10-dihydroanthracene. Indene and 1,2-dihydronaphthalene are preferred since they require a certain minimum temperature to polymerize and harden in contact with an oxidizing material. These temperatures may be achieved by the injection of steam or a gas-steam mixture into the wellbore at temperatures up to about 300°C, after the combustion promoter has been injected. Alternatively if an initiator-activator mixture is used, reaction is initiated at the temperature of the formation.

In the event the residual oil is too low to effect consolidation, a secondary consolidating material may be used such as unsaturated hydrocarbons of the olefin series, e.g., ethylene, propylene, butylene and butadiene or those having triple bonds. Other secondary consolidating materials may be unsaturated fatty acids such as linseed oil fatty acids and oleic acids.

Initiators that may be added to the mixture to control oxidation process include organic peroxides, which are particularly suitable for this purpose. The term "peroxide" is to be understood as including compounds which can be derived from hydrogen peroxide and contain organic groups such as hydroperoxides, dialkyl peroxides, diacyl peroxides, per acids, per esters, per ketals, ketone peroxides, preferably tertiary butyl perbenzoate, tertiary butyl hydroperoxide and methylisobutyl ketone peroxide.

The mixture may also include an activator which is a metal salt of the metals belonging to one of Groups IV to VIII of the Periodic System. Salts of iron, nickel, vanadium and cobalt are preferred, for example, iron sulphate, cobalt octoate or nickel chloride. The metal salt can, if necessary or desired, be dissolved or suspended in a solvent as, for example, vanadium oxychloride in isopropyl alcohol or cobalt octoate in styrene.

The oxidizing agent which may be used in the process according to the invention, may also be used as the after-wash fluid to insure the permeability of the sediment or formation which is to be consolidated. The injection rate of the oxidizing agent is suitably maintained between 2.0 and 50 scm/sq.m.hr. The oxidizing agent may be an oxygen-containing gas such as air or an inert gas as nitrogen, containing oxygen, or a gas-steam mixture or steam containing oxygen. These oxidizing agents must contain from 10 to 100 percent by volume of pure oxygen.

In order to improve the wetting characteristics of the sediment or formation which is to be consolidated, surface-active additives or wetting agents such as fatty alcohol sulphates, alkylaryl sulphonates, preferably lauryl sulphonate, may be injected in combination with the materials which are to effect the consolidating process.

The slug of the combustion promoter required for consolidating the formation should be about 0.1 to 0.9 times the pore volume of the bulk formation to be consolidated depending on the amount of the residual oil that is present. If an oxidation initiator plus activator is used the ratio of initiator:activator may be in the range of from 1 : 1 to 15000 : 1, but is preferably between 10 : 1 and 1500 : 1, in the slug which is injected into the region where the consolidation is to take place. If additional oil and/or a secondary consolidating material are injected, then the mixture of additional oil and/or secondary consolidating material and combustion promoter which is to be injected may be composed of 20–95 percent by weight of oil/secondary consolidating material and from 80–5 percent by weight of combustion promoter. The duration of solidification of the coke-like residue lasts between 1 hour and several days.

The invention is illustrated in the following examples which show that a firm, coke-like deposit forms within a short time and cements the fragments or particles of rock or bed together. This oxidation residue or deposit is stable in air up to a temperature of about 300° C and in steam up to a temperature of about 400° C.

EXAMPLE 1

A cylinder or cell of heat-resistant steel containing 20 grams of medium grain sand was saturated to 40 percent of the pore volume with oil (28° API) and to 40 percent with indene. Air was then passed axially through at a rate of 1.94 ccm/min at an excess pressure of 31 atmospheres and the sand packing was heated continuously. After 6 hours at a temperature of 231° C, the test was terminated. When the cell had cooled and was opened, the solid but permeable sand pack could be removed. The solidity of the packing showed itself to be so good that it could only be destroyed by using a hammer. A comparative test in which the sand packing was saturated only with oil showed that no consolidation had taken place.

EXAMPLE 2

A packing of medium grain fine sand was pressed into a steel ring of a diameter of 21.8 mm to a density of 1.9 gr/ccm. The pore volume was saturated with 30 percent oil (17° API) and 70 percent indene. The steel ring was inserted into a cell which was heated to a temperature of about 120° C. Following this air was passed through the mixture for five hours at the rate of 186 sccm/min. The cooled sand pack was submitted to a hardness test using the Hoppler consistometer. The depth to which a cylindrical test probe ($d = 6$ mm) having a conical point was able to penetrate under a load of 750 gr. was 2.8 mm, while the same test on an unconsolidated sand packing yielded a value of 9 mm.

EXAMPLE 3

An unconsolidated sand pack composed of medium grain sand (average diameter 0.25 mm) was placed in a cylinder which was divided axially in half by a septum of ceramic material. One half was saturated with oil (28° API) and the other with a mixture of 48.8 percent (by volume) oil (28° API), 48.8 percent tertiary butyl perbenzoate (TBPB) and 2.4 percent vanadium oxychloride dissolved in isopropylalcohol. In order to provide an effective gas permeability, nitrogen was fed through the cell containing the sand packing. Then air was fed through at a pressure of 46 atmospheres while the cell was slowly heated to give a temperature increase of 0.8° C per minute. After the temperature in the sand packing had reached 230° C, measured by a thermocouple, the injection of air and the heating were terminated. When the cell was opened it was evident that one part (half) of the packing which contained the oil, the initiator (TBPB) and the activator ($VOCl_2$) was quite solid while the other part which contained only the oil was damp and was not consolidated or hardened at all. The controlled oxidation at lower temperatures had left a firm deposit or residue which cemented the grains together.

I claim:

1. A method for consolidating an unconsolidated oil-bearing formation containing residual oil and penetrated by a wellbore comprising the steps of:
   a. injecting via said wellbore into said formation a combustion promoter comprising a mixture of a combustion initiator and an activator, wherein at least one activator is selected from the group consisting of vanadium oxychloride, iron sulfate and nickel chloride,
   b. injecting via said wellbore an after-wash fluid to insure the permeability of said formation,
   c. injecting via said wellbore an oxidizing material to effect oxidation of said mixture and residual oil and thereby consolidating said formation adjacent said wellbore.

2. The method of claim 1 wherein said oxidizing material is preheated to a temperature up to about 300°C.

3. The method of claim 1 wherein steam at a temperature up to about 300°C is injected with said oxidizing material.

4. The method of claim 1 wherein additional oil is injected with said combustion promoter.

5. The method of claim wherein a secondary consolidating material is injected with said combustion promoter.

6. The method of claim 5 wherein said secondary consolidating material is an unsaturated fatty acid.

7. The method of claim 6 wherein said unsaturated fatty acid is linseed oil fatty acid, oleic acid and mixtures thereof.

8. The method of claim 1 wherein said combustion initiator is an organic peroxide.

9. The method of claim 8 wherein said organic peroxide is selected from the group consisting of tertiary butyl perbenzoate, tertiary butyl hydroperoxide, methylisobutyl ketone peroxide and mixtures thereof.

10. The method of claim 1 wherein said oxidizing material is air.

11. The method of claim 1 wherein said oxidizing material is a mixture of an inert gas or nitrogen and oxygen, said oxygen being at least 10 percent by volume of the gas mixture.

12. The method of claim 1 wherein said after-wash fluid is an inert gas, nitrogen, air, steam and mixtures thereof.

13. The method of claim 1 wherein a surface active material is injected with said combustion promoter to improve the wetting characteristics of the formation being consolidated.

14. A method for consolidating an unconsolidated oil-bearing formation containing residual oil and penetrated by a wellbore comprising the steps of:
 a. injecting via said wellbore into said formation a combustion promoter comprising at least one autooxidizing material selected from the group consisting of indene, fluorene, 1,2-dihydronaphthalene, 9,10-dihydroanthracene and mixtures thereof,
 b. injecting via said wellbore an after-wash fluid to insure the permeability of said formation,
 c. injecting via said wellbore an oxidizing material to effect oxidation of said mixture and said residual oil and thereby consolidating said formation adjacent said wellbore.

15. The method of claim 14 wherein additional oil is injected with said combustion promoter.

16. The method of claim 14 wherein a secondary consolidating material is injected with said combustion promoter.

17. The method of claim 16 wherein said secondary consolidating material is an unsaturated fatty acid.

18. The method of claim 17 wherein said unsaturated fatty acid is linseed oil fatty acid, oleic acid and mixtures thereof.

19. The method of claim 14 wherein said combustion promoter contains a combustion initiator and activator.

20. The method of claim 14 wherein said oxidizing material is air.

21. The method of claim 14 wherein said oxidizing material is a mixture of an inert gas or nitrogen and oxygen, said oxygen being at least 10 percent by volume of the gas mixture.

22. The method of claim 14 wherein said oxidizing material is preheated to a temperature up to about 300°C.

23. The method of claim 14 wherein steam at a temperature up to about 300°C is injected with said oxidizing material.

24. The method of claim 14 wherein said after-wash fluid is an inert gas, nitrogen, air, steam and mixtures thereof.

25. The method of claim 14 wherein a surface active material is injected with said combustion promoter to improve the wetting characteristics of the formation being consolidated.

* * * * *